Patented Dec. 16, 1947

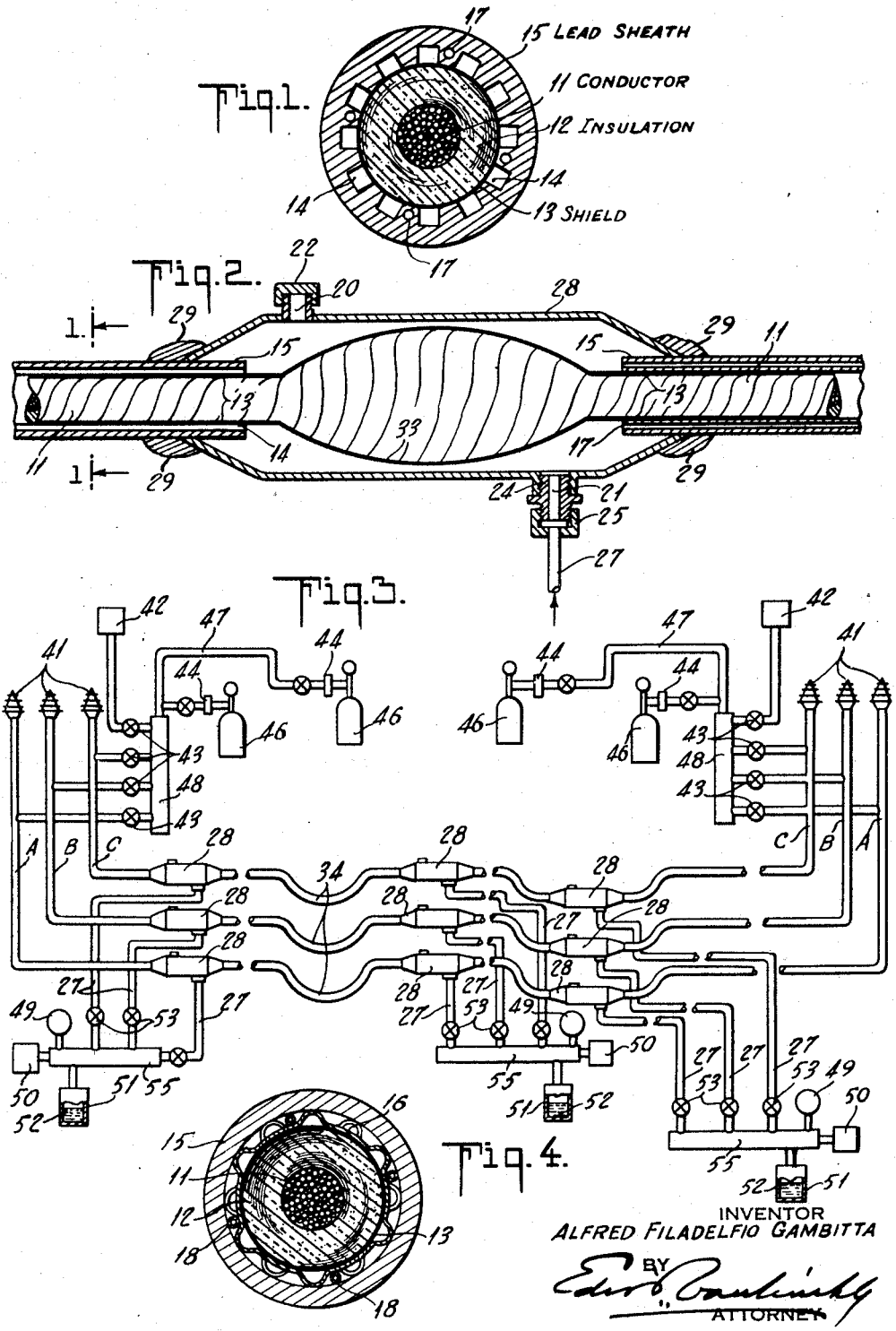

2,432,568

UNITED STATES PATENT OFFICE 2,432,568

GAS FILLED CABLE SYSTEM

Alfred Filadelfio Gambitta, Jersey City, N. J., assignor to Phelps Dodge Copper Products Corporation, Dover, Del., a corporation of Delaware Application August 15, 1944, Serial No. 549,589

7 Claims. (Cl. 174—15)

My invention relates to improvements in electric cable systems of the single conductor type and more particularly to improvements to the gas-filled cable systems.

The object of my invention is to provide a gas-filled cable system of the single conductor type which takes full advantage of the inherent theoretical superior characteristics of such a cable when practical means are used to maintain at all times during operation of the cable a suitable gas pressure throughout the length of the cable in order to exclude foreign substances within the cable system such as air and water and secure the superior electric characteristics that the insulating neutral gas, such as nitrogen for example, under a selected positive pressure imparts to the insulation of the cable particularly when the cable operates under a variable load as in the case of all the underground electric cable systems heretofore installed.

A further object of the invention is to provide a means to indicate the presence of gas leaks in a cable of the single conductor type and to eliminate the need for periodic draining of impregnating compound to clear the gas channels.

A further object of my invention is to provide gas containers full of neutral insulating gas, as for instance nitrogen, connected to every cable joint casing to supply gas to said casings and the adjacent cables, thereby keeping the entire cable system under a desired positive gas pressure at all points and at all times regardless of any slugs of compound which may form at any point in the cable system and at the same time using the said gas containers as a sump for the compound which may ooze out of the cable insulation due to load conditions.

A further object is to provide an improved construction of cable sheath which will have fluid tight gas channels formed within the body of the sheath extending uninterrupted throughout the cable length.

In the cable art it is a well known fact that a cable when it is maintained under a selected positive pressure by means of an insulating oil or neutral gas, its electrical stability is remarkably improved. An example of the former is the so-called oil-filled type cable and of the latter the gas-filled type cable.

Heretofore the duct type of gas-filled cable has been of the multiple conductor type when used for transmisssion or distribution of electrical power. The use of single conductor gas-filled type cable has been confined to special applications as for instance generating leads. These applications have required the use of comparatively short cable lengths and, therefore, the simple means of feeding gas from one cable terminal end or from both ends has been sufficient in order to obtain a positive assurance that the cable would be under gas pressure at every point and at all times.

The transmission of great blocks of electrical power for long distances very often requires the use of single conductor underground cables and the gas-filled type in many cases is the most economical and reliable type provided that its inherent superior characteristics are fully maintained during operation under variable load conditions. This is obtained if the cable during its operating life is maintained under a selected positive gas pressure at all times and along its entire length. If any gas leak does occur in any part of the cable circuit, the gas-feeding system must maintain a positive pressure at the point of leak in order to exclude foreign substances such as air and water and at the time as normally desirable send an alarm calling the attention of the man in charge of maintenance for the necessary repair before an electrical failure of the cable could occur.

Single conductor gas-filled cables of the present standard constructions are not entirely suitable for long distances of power transmission. The usual conventional gas channels are the small spaces provided under the lead sheath covering by means of either using a fluted lead sheath construction or by inserting a metallic button embossed spacer tape wound helically around the cable core with the usual lead sheath covering overall.

It is readily seen that for mechanical and economical reasons these gas channels must be of comparatively small size and, therefore, the cable must be provided with additional means in order to obtain the fundamental requirements of a gas-filled cable; that is, the selected gas pressure must exist at every point of the cable system and at all times. These small gas channels during the operation of the cable may be obstructed by the impregnating compound that oozes out of the insulation due to load conditions and forming slugs of compound.

In an ideal cable line the compound oozing from the insulation should drain into the casing of the cable joints. However, as is found in practice, the profile of the ground in which the cable is laid is variable and lower points invariably do exist in every instance. This facilitates the formation of slugs of compound obstructing in part or entirely the flow of gas along the cable length.

When this takes place the cable between the obstruction and the gas supply will be under the desired gas pressure but the portion of the cable beyond the obstruction may be under a pressure even below atmospheric presenting, therefore, a potential source of danger to the life of the cable.

The primary object of my invention is the provision of means which would prevent the formation of low pressure spots within a gas-filled cable system of the single conductor type.

More specifically, the object of my invention is the provision in a single conductor gas-filled cable system of connecting to every splice of the cable an auxiliary tank full of neutral insulating gas as for instance nitrogen. The effect of this is to insure that the selected gas pressure will always exist on the opposite sides of any obstruction in the normally open free feed gas channels.

The foregoing and other features of my invention will now be described in connection with the accompanying drawing forming part of this specification in which I have represented my cable system in its preferred form, after which I shall point out in the claims those features which I believe to be new and of my own invention.

Figure 1 is a cross section of the cable which I may employ, along the line 1—1 Figure 2.

Figure 2 is a longitudinal section through a joint, employed for connecting together two lengths of my cable.

Figure 3 is a diagrammatic sketch showing my cable system in its preferred form.

Figure 4 is a cross section similar to that shown in Figure 1 of a modified cable which I may employ.

In the carrying out of my invention I may use any type of single conductor 11 enclosed in insulation 12 normally made of helically wound paper tapes according to present practice and saturated with impregnating compound which is fluid at operating temperatures. Over the insulation is provided a helically wound electrostatic shield 13. The entire structure is now covered with an impervious outer sheath 15 normally but not necessarily made of lead according to present practice and with its inner surface being of the present fluted construction which provides a plurality of circumferential gas channels 14 extending longitudinally through the entire cable length and all being opened longitudinally to the inner body of shielded insulation.

Within the sheath I provide a plurality of continuous fluid-tight gas channels 17 formed in the body of the fluted outer cable sheath during the process of extruding this sheath over the insulated shielded conductor. While I have shown four of these fluid-tight gas channels 17 located in a preferred position, it should be understood that any number of these channels may be used in the body of the outer cable sheath and at any desired location without departing from this important feature of my invention. The ends of these fluid-tight gas channels in each cable length are in communication with the interior of the two joint casings connected at the cable ends and through the joint casings they form a continuous gas passage from end to end of the jointed cable lengths maintaining a constant gas flow and the same gas pressure in each cable joint.

In the modification illustrated in Fig. 4 in which parts corresponding to those of Fig. 1 are identified with the same reference numerals and differs therefrom only in the addition of parts 18 which are continuous fluid-tight solid wall gas channels made of metal or otherwise and which are located over the spacer tape 16 between the shoulders of the embossed button of said spacer tape and directly underneath the outer sheath.

It should be understood that while in Fig. 4 I have shown four of these fluid-tight gas channels 18 any number of them could be used without departing from this important feature of my invention. The ends of these fluid-tight gas channels in each cable length are in communication with the interior of the two joint casings connected at the cable ends and through the joint casings they form a continuous gas passage from end to end of the jointed cable lengths maintaining, therefore, a constant gas flow and the same gas pressure in each cable joint.

Referring to Figure 2, illustrating my cable joint in section, which is used to connect the ends of two sections of my preferred cable lengths. Two cable sections such as described above are connected as follows: The lead sheath 15 of the two sections as well as the gas passages are cut back (as shown). The conductor of the two cables laid bare in accordance with present practice and are joined with suitable connection (not shown) by soldering or pressing, and wrapped with insulation and covered with a metallic tape 33 which is connected to the shielding tape 13. When desirable, the continuity of this electrostatic shield 33 over the entire surface of the joint insulation could be broken by means of either leaving a circumferential gap preferably at the center surface of the joint or by overlapping the center portions of the two halves of electrostatic shield of the joint with several layers of insulation between the two center portions. When it is desirable to break the continuity of the electrostatic shield 33, the continuity of the cable lead sheath must be broken also usually by means of a sheath insulator either on the joint casing or on the cable sheath. As this is common practice, no further detailed description is necessary here.

The cable splice is then enclosed in a joint casing 28 with solder wipes 29 according to present practice and having openings 20 and 21 with closure 22 and closure fittings 24, 25 with metal tubing 27 for drainage respectively. The gas channels 14 of each cable length and the continuous fluid-tight solid wall gas channels 17 or 18 are left opened and in communication with the interior of the joint casing.

Referring now to Fig. 3 which illustrates the practical application of the improvement of a gas-filled cable system of the single conductor type constructed with parts thereof according to my invention, A, B and C indicates the three separate cables of a three-phase circuit each made of a number of continuous cable lengths jointed together in manholes following common practice. Lengths or sections of cable are spliced together, 28 the casings of the joints between lengths or sections, 34 the dips or low points in the cable more readily susceptible to the formation of slugs of compound, 41 indicates the cable potheads which are filled and maintained filled with a neutral gas, such as nitrogen, under positive pressure as likewise are the cables and joint casings, gas feeding equipment used at one or both cable terminal ends consisting of an alarm pressure relay 42 which gives an indication when the pressure falls below a certain minimum or increases above a desired maximum, valves 43, pressure regulators 44, nitrogen gas cylinders 46, metal tubing 47, and manifold 48.

The three cable joints 28, one for each phase, in each manhole are connected in parallel to a gas container 51 by means of metal tubings 27 connected at the bottom opening of each joint casing as shown in Fig. 2 and a manifold 55 connected through valves 53 to the metal tubings 27 and gas container 51. To the manifold 55 are connected also a pressure gauge 49 and an alarm pressure relay 50. At 52 is indicated the compound which may ooze out from the cable insulation draining first into the joint casings and then into the gas container which act also as a sump for such compound drainage.

The gas containers 51, the manifolds 55 and the metal tubings 27 are filled and maintained filled with neutral gas, such as nitrogen, under a desired pressure. It is readily seen that these gas containers besides acting as a sump for the compound drainage they also supply gas to the joint casings and their adjacent cables thereby keeping the entire system under a positive gas pressure at all points and at all times regardless of any slugs of compound which may form at any point in the cable system and particularly at low points 34. Furthermore, by means of the pressure gauges 49 a prompt inspection of the condition of the entire system can be made and by means of the alarm pressure relays 50 a continuous automatic supervision of the entire system is readily available.

It is readily seen that the aforesaid gas containers 51 can be made of ample capacity to act as a sump for the entire amount of compound that may be expected to drain out from the cable insulation during its operating life, thereby eliminating the need for periodic draining of such compound from the joint casings in order to clear the gas channels.

Furthermore, the use of the aforesaid gas containers 51 gives a positive assurance that the cable system will be kept under the desired positive gas pressure for a period of time long enough to permit inspection and repair when small gas leaks do occur in the system.

An important detail of my cable system is the construction of the continuous fluid-tight gas channels 17 formed in the body of the fluted cable sheath 15 during the process of extruding this sheath over the insulated shielded conductor thereby obtaining an improved construction of cable sheath which results in a practical fundamental advantage of an economical cable construction having within its body the necessary fluid-tight gas channels which permit to impart to the cable the inherent superior electric characteristics of a gas-filled cable when practical means are used to maintain at all times during operation of the cable a suitable gas pressure throughout the entire length of the cable.

It is readily seen that these aforesaid continuous fluid-tight gas channels formed in the body of the fluted cable sheath during the process of extruding this sheath over the insulated shielded conductor, are obtained without any further requirement of material, or space within the cable, or operations during the construction of the cable besides that required for the construction of the cable according to present practice. The operation of extruding a fluted lead sheath over an insulated conductor according to present practice is performed through a normal lead press by means of the use of an appropriate extruding die. The operation of extruding a fluted lead sheath having the aforesaid fluid-tight gas channels formed in the body of said sheath is performed also through a normal lead press by means of the use of a modified extruding die constructed according to the requirements of the object of this invention; therefore, the operation of extruding such improved cable sheath construction is simple, economical, practical, effective and reliable and yet does not add anything to the manufacturing cost of the cable constructed according to present practice.

I wish it distinctly understood that my cable system herein above described and illustrated, is in the form in which I desire to construct it and that changes or variations may be made as may be desirable or convenient without departing from the salient features of my invention and I therefore intend the following claims to cover such modifications as naturally fall within the lines of invention.

I claim:

1. An electric cable system comprising a single conductor, permeable insulation surrounding the conductor impregnated with a compound, a lead sheath surrounding the insulation, open walled gas delivery means within the sheath spaced around the inner wall thereof, continuous fluid tight gas conducting means within the sheath, joints connecting said cable sections, casings surrounding said joints, said open walled gas delivery means and the fluid tight gas conducting means opening into the casings, a gas pressure reservoir connected to the underside of the casings whereby the reservoir acts as a sump to receive any drainage of the viscous compound, and at the same time to serve as a pressure means connected directly to the gas delivering means so that the pressure throughout the system is kept uniform.

2. An electric cable system comprising a single conductor, permeable insulation surrounding the conductor impregnated with a compound, a lead sheath surrounding the insulation, open walled gas delivery means and fluid tight gas conducting means integral with the sheath, and spaced around the insulation joints connecting said cable sections, casings covering said joints, said open walled gas delivery means and the fluid tight gas conducting means opening into the casings, a gas pressure reservoir connected to the underside of the casings whereby the reservoir acts as a sump to receive any drainage of the viscous compound, and at the same time to serve as a pressure means connected directly to the gas delivering means so that the pressure throughout the system is kept uniform.

3. An electric cable system comprising a single conductor, permeable insulation surrounding the conductor impregnated with a compound, a lead sheath surrounding the insulation, open walled gas delivery means equally spaced around the inner wall of the sheath and fluid tight gas conducting means integral with the sheath, joints connecting said cable sections, casings covering said joints, said open walled gas delivery means and the fluid tight gas conducting means opening into the casing, a combined pressure means and sump whereby pressure is delivered to the insulation simultaneously with receiving any drainage of the viscous compound.

4. An electric cable system made up of a series of sections, each including a single conductor, permeable insulation surrounding the conductor impregnated with an insulating compound, a sheath over all, said sheath provided with gas delivery channels open to the insulation and a plurality of gas tight conducting channels within the body of the sheath and spaced around the insulation, a casing covering each joint between the sections, said gas delivery channels and the said gas tight conducting channels opening into adjacent casings, a gas pressure reservoir connected to the casing to deliver pressure to the casing and gas tight conducting channels and through the delivery channels to the insulation, said reservoir acting as a sump to receive drainage of the insulating compound which may ooze out of the insulation, whereby pressure throughout the system is kept uniform should the delivery channels be blocked at any point in the line.

5. An electric cable comprising a single conductor, insulation surrounding the conductor impregnated with a compound, a lead sheath surrounding the conductor having integral gas channels, some of the said gas channels opened to the insulation while others are fluid tight, said channels spaced around the insulations.

6. A gas-filled cable system of the single conductor type comprising jointed lengths of cable, each cable length consisting of a conductor enclosed in a body of permeable insulation impregnated with a compound, a metal shielding tape over the insulated conductor, an impervious sheath over the insulated shielded conductor having a series of longitudinal gas channels at its inner surface, said channels extending through each cable length and some of the said channels being opened longitudinally to the inner body of insulation, the others forming fluid tight gas conducting channels supplying a constant flow of gas from one end to the other of each cable length and in a series of jointed cable lengths maintaining all the joint casings at a constant gas pressure, impervious casings sealed at their ends to adjacent sheaths for connecting them and enclosing the joints between the conductors, the above said longitudinally sheath gas channels being in communication with the joint casings at the opposite ends of the jointed cable lengths, an opening in the upper and lower wall portions of the casing, a movable closure for the upper opening and a movable closure fitting for the lower opening in connection with means for connecting lower opening to the lower openings of joint casings of other cables of the same gas-filled cable system.

7. A gas-filled system applied to an existing cable or cables of the so-called solid type for rejuvenating it consisting of a gas container connected to an opening in the lower wall of the existing joint casing through a removable closure fitting, a solid wall gas containing tube and a manifold containing valves, a pressure gauge and a pressure alarm device, said gas container forming a sump for receiving the cable compound which may ooze from the joint and conductor insulation and may drain into the gas container, the gas container being kept full of insulating gas under a desired pressure which supplies gas to the existing joint casing and through it to the jointed lengths of cable and maintaining same under positive pressure, the gas container being connected to the joint casings of the cables forming part of the same solid type cable system to be rejuvenated.

ALFRED FILADELFIO GAMBITTA.

REFERENCES CITED

The following references are of record in the file of this patent:

UNITED STATES PATENTS

| Number | Name | Date |
| --- | --- | --- |
| 2,261,742 | Matsumoto | Nov. 4, 1941 |
| 2,145,182 | Kirch | Jan. 24, 1939 |
| 2,255,832 | Thompson | Sept. 16, 1941 |
| 1,770,851 | Hayman | July 15, 1930 |
| 882,141 | Cope | Mar. 17, 1908 |
| 2,248,588 | Shanklin et al. | July 8, 1941 |

FOREIGN PATENTS

| Number | Country | Date |
| --- | --- | --- |
| 460,642 | Germany | June 5, 1928 |